Feb. 25, 1964   F. SINGER   3,122,082

PHOTOGRAPHIC SHUTTER

Filed March 19, 1962

3,122,082
PHOTOGRAPHIC SHUTTER
Franz Singer, Munich, Germany, assignor to Compur-Werk G.m.b.H. & Co., Munich, Germany, a firm of Germany
Filed Mar. 19, 1962, Ser. No. 180,424
Claims priority, application Germany Mar. 30, 1961
3 Claims. (Cl. 95—63)

This invention relates to a photographic shutter, and more particularly to the means for operatively connecting the blade operating parts of the shutter to the delaying mechanism or retarding mechanism for slowing the movement of the blade operating parts, in order to time the exposure.

An object of the invention is the provision of generally improved and more satisfactory mechanism of this kind.

Another object of the invention is the provision of delaying or retarding means particularly adapted to and useful in a shutter of the kind in which a rotary master member serves as a crank for driving a blade ring to open and close the shutter blades.

Still another object is the provision of delaying mechanism having an input member of simple and compact form which can be arranged relatively close to a rotary master member, to promote compactness of the shutter as a whole.

Figure 1:
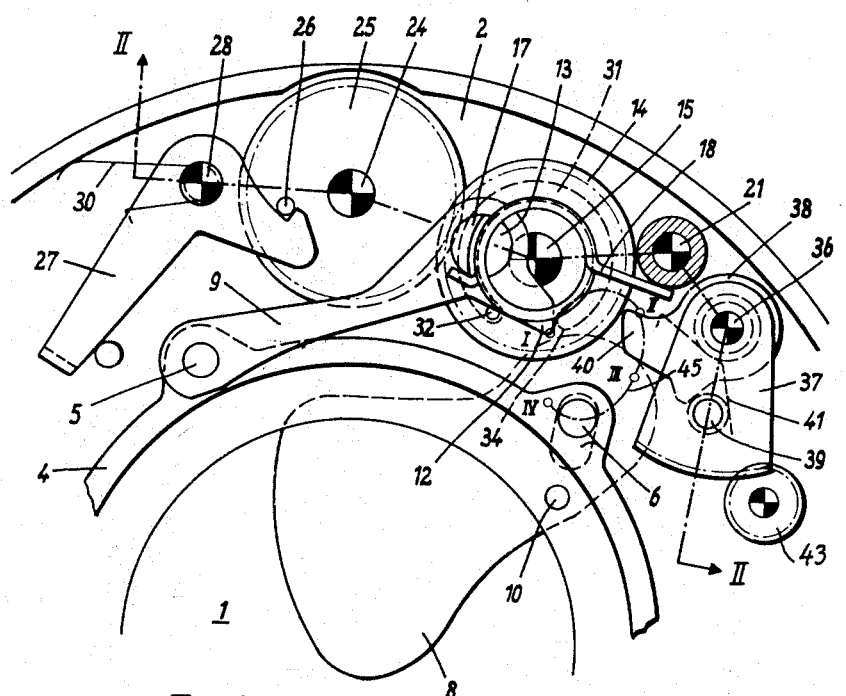
Figure 2:
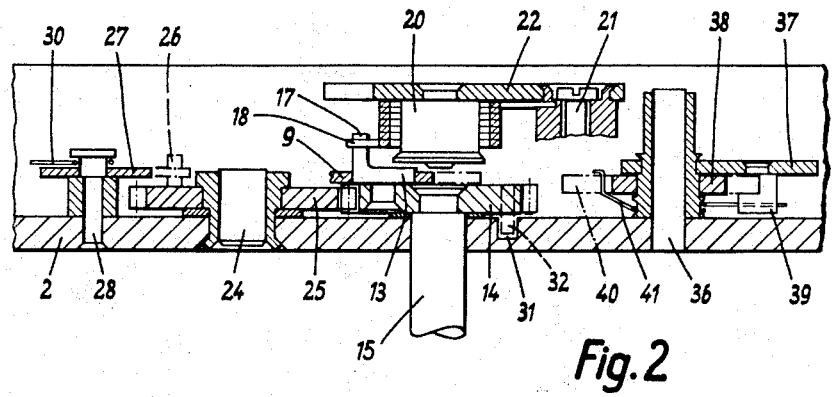

These and other desirable objects may be attained in the manner disclosed as an illustrative embodiment of the invention in the following description and in the accompanying drawings forming a part hereof, in which:

FIG. 1 is a fragmentary plan view or front face view of a portion of a photographic shutter illustrating a preferred embodiment of the present invention, other parts not necessary to an understanding of the present invention being omitted; and FIG. 2 is a section taken approximately on the line II—II of FIG. 1.

The present shutter in its preferred form comprises an annular base plate or mechanism plate 2 surrounding a central aperture 1 which constitutes the exposure aperture of the shutter, the base plate being suitably mounted within the usual annular housing or casing customarily found in shutters of the objective type or between-the-lens type. A conventional blade ring 4 rotates concentrically with the aperture 1, and carries a pin 5 for connection with the driving means. The blade ring also carries a series of blade pins 6, one for each shutter blade, there usually being about five blades as well known in the art, but for the sake of simplicity only one blade pin 6 and one shutter blade are shown. The blade pin 6 operates, as usual, in the customary slot of the shutter blade 8 which is pivoted on a stationary pivot 10. Merely by way of example and not by way of limitation, the blades 8 are here illustrated as single ended blades or reversing blades, so arranged that when the blade ring 4 turns in a clockwise direction, each blade 8 swings clockwise on its pivot 10 to open the exposure aperture, and then the blade ring 4 reverses its movement and turns in a counterclockwise direction, swinging each blade 8 back in a counterclockwise direction so that all of the several blades collectively overlap each other and close the exposure aperture, as will be well understood by those skilled in the art.

The pin 5 on the blade ring is pivoted to one end of a link 9, the other end of which is pivoted to a crank pin 13 on the rotary master member 14 which is fixed to a tensioning shaft 15 which is parallel to the optical axis and which extends out through the back of the shutter and into the associated camera body on which the shutter is mounted, where it is arranged to be turned by suitable mechanism of any known form, the details of which are not important for purposes of the present invention. The term "master member" is here used in the technical sense in which it is well understood in the photographic shutter field, meaning the spring-powered main drive member whose motion, when it runs down from a tensioned position to a rest or relaxed position, serves to furnish the motive power for opening and closing the shutter blades to make an exposure.

The crank end of the connecting link 9 (that is, the end thereof adjacent to the crank pin 13) is formed with a beak or nose 12 which cooperates with retarding means during the exposure cycle, to retard the running down motion of the parts and thus to time the exposure to the desired extent. This will be further described below. The crank pin 13 has an upward extension or arm 17 which is attached to one end of the main driving spring or master spring 18. The master spring is coiled around a stationary cylindrical member 20 which is fixed to and depends from a bridge member 22 stationarily secured to the base plate 2 by the screw 21, in such position that the cylinder 20 is coaxial with the shaft 15 and master member 14, but spaced axially from the master member in order to allow room for operation of the link 9, as seen in FIG. 2. The other end of the master spring 18 bears against the fixed bridge 22, and the master spring urges the master member 14 to turn in a clockwise direction when viewed from the front as in FIG. 1.

The master member 14 has gear teeth on its periphery, which mesh with the teeth of a gear wheel 25 rotatable on a fixed pivot 24 on the base plate 2. This gear wheel 25 has an upstanding latch pin 26 for engaging a latching shoulder or abutment on a latch pawl 27 mounted on the fixed pivot 28 and urged counterclockwise into latching position by the hairpin spring 30.

The parts are shown in FIG. 1 in their tensioned or cocked position. If the latch pawl 27 is released by clockwise movement on its pivot 28, so that it disengages from the pin 26, the gear 25 will turn counterclockwise and the master member 14 will turn clockwise under the influence or power of the master spring 18. Formed in the base plate 2 is an arcuate groove 31 concentric with the shaft 15, and a pin 32 on the master member extends downwardly from the master member into this groove, so that the pin engages with one end or the other of the arcuate groove, to serve as a stop to limit rotation of the master member in either direction. FIG. 2 shows the pin 32 somewhat displaced angularly from its true position, in order to illustrate it better.

On the base plate 2 is an upstanding stationary pivot 36, located near the master member 14. A gear segment 37 is rotatable on the pivot 36, and the gear teeth on this segment mesh with the teeth of a gear 43 which is one of the gears of a conventional gear retarding train as customarily used in photographic shutters. Such gear trains are well understood in the art and widely used, and the details thereof are unimportant for purposes of the present invention, so the rest of the gear train is not illustrated here, but it will be understood that there are other gears following the gear 43, the gear train usually terminating in an escapement wheel or star wheel which operates a vibrating anchor or pallet which helps to produce the required resistance and the desired delaying effect in known manner.

According to the present invention the beak or nose 12 of the link 9 serves to operates the gear segment 37. Preferably, however, it does not make contact directly with the gear 37, but contacts with a member 38 which is pivoted on the same pivot 36 and which constitutes the input member or initial driving member of the retarding gear train. A shoulder or abutment on the input member 38 bears against a pin 39 on the gear segment 37, being held resiliently in this position by the hairpin spring 41.

The input member 38 also has a tooth or projecting portion 40 to intercept the motion of the nose or beak 12 of the link 9 during the running down motion of the master member, so that the resistance offered by contact of the beak 12 with the tooth 40 will serve to slow the running down motion and thus increase the duration of the exposure.

During the running down motion of the master member from the tensioned position shown in FIG. 1 to the fully run down rest position, the beak 12 follows a locus indicated by the broken line 45, various positions along which locus are indicated schematically by the small circles numbered I, II, III, and IV, respectively. During the first part of the running down motion of the master member, while the beak is moving along the broken line path 45 from the position I to position II, the link 9 pulls the pin 5 to the right, turning the blade ring 4 in a clockwise direction to open the shutter blades. At just about the time the shutter blades reach fully open position, the beak 12 reaches position II of the locus 45 and makes contact with the tooth 40 of the gear train input member 38. During further running down movement, while the beak 12 moves from position II to position III, there is little if any movement of the shutter blades, and they remain substantially fully open. But the beak 12, being now in contact with the input member 40 of the retarding train, cannot move from position II to position III except by displacing the tooth 40 in a counterclockwise direction on the pivot 38, and this (because of the pin 39) requires counterclockwise displacement of the gear segment 37, driving the gear train, the resistance and mass of which slow down the motion to the required extent. As usual, the extent of delay is adjustable by the timing cam of the shutter, in the usual well known manner.

At about the time the beak 12 reaches position III, it slips past the end of the tooth 40 of the retarding input member 38, so that the retarding train offers no further resistance to continued rotation of the master member, and the master member can now speed up and quickly move the beak from position III to position IV, during which part of the movement the link 9 pushes the pin 5 to the left, turning the blade ring 4 counterclockwise and closing the blades once more. It is seen from the broken line 45 in FIG. 1 that the locus of the beak 12 is approximately elliptical, so far as it goes, but does not complete the ellipse, since the master member never turns through a complete revolution.

With this arrangement, the input member 38 of the retarding gear train can be placed relatively close to the master member, thus saving space and facilitating the design of a compact shutter. Even if the shutter housing or casing is of the normal size, the location of the input member of the retarding train in this position close to the master member allows the entire retarding train to be brought up close to the master member and leaves more room in other parts of the shutter housing for other mechanism which may be desired therein.

After the shutter has run down in an exposure cycle, it must again be cocked or tensioned ready for the next exposure. This is done by turning the shaft 15 in a counterclockwise direction, the motion being produced by any suitable mechanism of known form in or on the camera body with which the shutter is associated. The counterclockwise motion of the shaft 15 causes corresponding counterclockwise rotation of the master member 14 and clockwise rotation of gear 25, during which the pin 26 displaces the nose of the latching pawl 27 and then engages behind the latching nose in the position shown in FIG. 1, ready to be released for the next exposure. Also, during the tensioning cycle, the beak 12 follows the locus 45 in a reverse direction, from the position IV through the successive positions III and II back to the initial tensioned position I, and in so doing, the beak displaces the tooth 40 in a clockwise direction on the pivot 36, against the force of the light hairpin spring 41, after which the tooth 40 moves back into contact with the pin 39 under the influence of its spring 41. The reverse or tensioning movement of the master member likewise causes the shutter blades to open and close, but this does not fog the film or make an exposure, because at this time the exposure aperture is covered by a suitable "cover blind" or cover flap of known form, the details of which are not important for purposes of the present invention and therefore are not shown.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic shutter comprising a blade actuating ring, a rotary master member mounted for running down movement from a tensioned position to a rest position, said master member having a crank pin thereon, said blade ring having a pivot pin thereon, a connecting link pivotally mounted near one end on said pivot pin and pivotally mounted near its other end on said crank pin so that said connecting link causes motion of said blade ring as a result of running down movement of said master member, a beak-like projection on said connecting link near the end thereof which is mounted on said crank pin, and retarding means having an input member lying in the path of travel of said beak-like projection to be engaged thereby so that said retarding means offers resistance to the movement of said beak-like projection and hence to the running down movement of said master member.

2. A construction as defined in claim 1, in which said retarding means includes a gear segment and in which said input member is in the form of a tooth mounted for pivotal movement with respect to said gear segment and arranged to transmit motion to said gear segment in one direction and to move idly away from said gear segment in the opposite direction.

3. A construction as defined in claim 1, further including a master driving spring of coil formation mounted coaxially with said master member and engaging said crank pin to transmit rotary force to said master member through said crank pin.

References Cited in the file of this patent

UNITED STATES PATENTS 2,663,235     Fuerst _____ Dec. 22, 1953